(12) United States Patent
Traxler

(10) Patent No.: US 6,182,412 B1
(45) Date of Patent: Feb. 6, 2001

(54) ARCHITECTURAL WATERPROOFING MEMBRANE AND TERMITE BARRIER

(76) Inventor: Timothy L. Traxler, 15166 Hooper Ridge Rd., Millfield, OH (US) 45761

(*) Notice: Under 35 U.S.C. 154(b), the term of this patent shall be extended for 0 days.

(21) Appl. No.: 09/288,167

(22) Filed: Apr. 8, 1999

Related U.S. Application Data

(60) Provisional application No. 60/081,021, filed on Apr. 8, 1998.

(51) Int. Cl.$^7$ ........................................................ B27K 5/00
(52) U.S. Cl. ........................ 52/517; 52/101; 52/169.14; 428/36.2; 43/118; 43/121; 43/132.1
(58) Field of Search ................................ 52/101, 169.14, 52/517; 428/36.2, 253, 284, 247; 43/132.1, 118, 121, 124

(56) References Cited

U.S. PATENT DOCUMENTS

| | | |
|---|---|---|
| 4,390,585 | 6/1983 | Holden . |
| 4,814,227 | 3/1989 | Maeda et al. . |
| 5,417,017 | 5/1995 | Toutountzis . |
| 5,543,188 | 8/1996 | Te'eni . |
| 5,580,630 | 12/1996 | Byrd . |

Primary Examiner—Carl D. Friedman
Assistant Examiner—Christy M. Syres
(74) Attorney, Agent, or Firm—Siemens Patent Services, LC

(57) ABSTRACT

Several embodiments of a prefabricated barrier for providing protection to subterranean walls and other structural members against both penetration by water and by termites, are disclosed. The barrier has a tacky and waterproof compound, preferably an asphaltic compound, protected by a release liner which is peeled from the web immediately prior to installing the web on building surfaces. A layer of stainless steel mesh is used to inhibit passage of termites. In the first embodiment, the invention comprises protective film (preferably polyester), stainless steel mesh, tacky waterproof compound, and a release liner (preferably polyethylene). In the second embodiment, the layers include a release liner, a first layer of tacky compound, a stainless steel mesh, a second layer of tacky compound, and a second release liner (or protective film). The double release liner embodiment is symmetrical, and can therefore be installed with either side against the surface to be protected. In the third embodiment, there is provided a release liner, a first layer of tacky compound, fiber reinforced material, (preferably fiberglass) a second layer of tacky compound, a stainless steel mesh, and a layer of protective film.

5 Claims, 2 Drawing Sheets

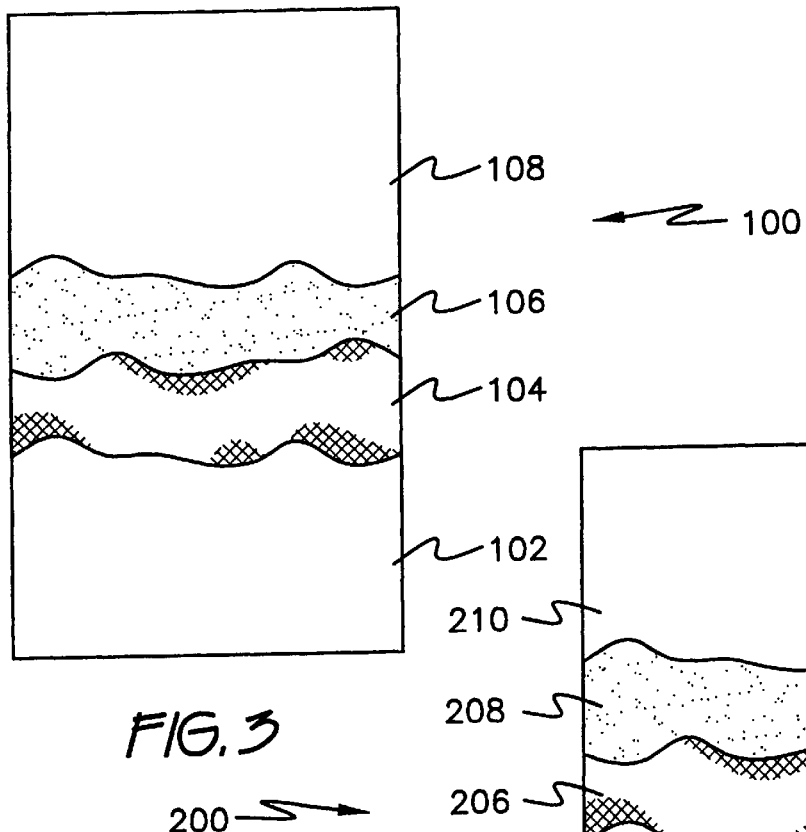
FIG. 3
FIG. 4
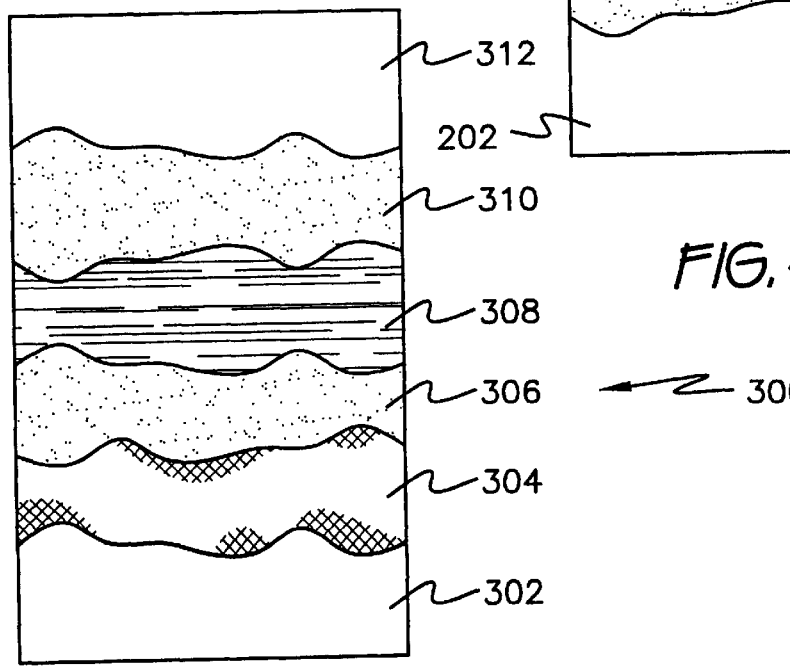
FIG. 5

ARCHITECTURAL WATERPROOFING MEMBRANE AND TERMITE BARRIER

CROSS REFERENCE TO RELATED APPLICATIONS

This application is related to U.S. Provisional Patent Application No. 60/081,021, filed Apr. 8, 1998.

BACKGROUND OF THE INVENTION

1. Field of the Invention

The present invention relates to protective barriers for buildings. More particular, the present invention comprises a unitary barrier serving multiple protective functions for subterranean building surfaces, including waterproofing and inhibiting infiltration of termites into a protected space.

2. Description of the Prior Art

Buildings having foundations consisting of basements, crawl spaces, stem walls, grade beams, and other subterranean walls and other surfaces of occupied or unoccupied spaces are susceptible in many areas to infiltration of water and by termites. Waterproofing has been provided to answer the former need. In many cases, waterproofing is accomplished by coating the exterior surface of subterranean walls with bitumen and similar water resistant materials. Stock webs of asphaltic, rubber, plastic, latex, or acrylic composition reinforced with or without fiberglass (or other reinforcement materials are known. However, the known products lack stainless steel mesh for termite control in combination with a waterproofing barrier with a tacky surface and a release liner for assisting in installation, as taught by the present invention.

U.S. Pat. No. 4,390,585 issued to Holden on Jun. 28, 1983 discloses a durable flexible membrane and method of making same. This membrane has a dense base or core fabric of multi-filament synthetic polymer yarns. PVC resin is used to coat the yarns, and additional coatings of the same composition are applied to both sides of the material. The resulting membrane is excellent for use on a roof, but is not designed with a steel mesh for inhibiting termites, or with a tacky surface for assisting in installation.

An adhesive sheet for preventing aquatic growths and method for preventing aquatic growths is taught in U.S. Pat. No. 4,814,227 issued to Maeda et al. on Mar. 21, 1989. This invention uses an adhesive layer formed on a primer layer in the form of a plate of copper-nickel alloy. The metal plate reduces the flexibility of the sheet (as opposed to a steel mesh or screen), making it difficult to install around sharp corners as is taught by the present invention. In addition, the adhesive used is primarily for underwater applications and does not include materials which are both tacky as well as flowing (for filling in recesses and holes in the mesh.

U.S. Pat. No. 5,417,017 issued to Toutountzis on May 23, 1995 is directed to termite control using a steel mesh, and is hereby incorporated by reference. In this patent, it is shown that a stainless steel mesh can be used as a termite barrier. In addition, in column 3, lines 35–42, the combining of the mesh into a plastic sheet for both moisture and termite control is discussed. The actual method of combining the sheet and mesh is not disclosed, nor is the use of a waterproof adhesive layer for installation, especially on vertical wall surfaces. Furthermore, this invention provides a moisture barrier only, as opposed to the present invention which includes a waterproof barrier that protects against water that may collect around the lower exterior walls of buildings.

A flexible protective membrane particularly useful for waterproofing and protecting reinforced concrete bodies and metal pipes is shown in U.S. Pat. No. 5,543,188 issued to Te'eni on Aug. 6, 1996. The patent discusses the use of bituminous materials to waterproof concrete structures, but does not disclose or teach combining a waterproof layer with a steel mesh for termite control.

U.S. Pat. No. 5,580,630 issued to Byrd on Dec. 3, 1996 discusses multi-layer waterproofing articles including a layer of water-soluble polymer. The water-soluble polymer is used to coat the adhesive layer to prevent the adhesive from adhering to itself without the use of a release layer. Asphalt tar and pitch in addition to other materials, are discussed for use as the adhesive, however, there is no discussion of steel mesh or termite control.

None of the above inventions and patents, taken either singly or in combination, is seen to describe the instant invention as claimed.

SUMMARY OF THE INVENTION

The present invention provides a prefabricated web for providing protection to subterranean walls and other structural members against both penetration by water and by termites. Protection against two hazards is thus provided by installing a single member. The novel web may be cut to fit and adhered to subterranean wall (or any desired) surfaces.

Preferably, the subterranean wall surfaces are dry-primed, so that a tacky surface will adhere thereto. The novel web has a tacky surface protected by a release liner (preferably of polyethylene but may be other plastics, latex, acrylic, paper, etc.), which is peeled from the web immediately prior to installing the web on building surfaces. The liner preserves the tacky surface from contamination by dirt and other substances which would cover the tacky surface, thereby rendering the same less effective for installation. Some embodiments of the invention may require adhesive or cement to be applied to the substrate, to the web itself, or to both.

The web has at least one waterproof (as opposed to moisture or dampness resistant) member, which may or may not have a structural reinforcing member, and includes a layer of stainless steel mesh. In one embodiment, the waterproof member is asphaltic, which is tacky at ordinary ambient temperatures. Of course other materials could be used, such as rubber, plastic, latex, or acrylic applied with an adhesive. This waterproof material is covered by a release liner, so that its tacky properties (and a clean, uncontaminated surface) are preserved until immediately prior to application. The stainless steel mesh has openings too small to allow termites to pass through. Stainless steel is a material which resists attack by deleterious influences present in the subterranean environment, and thus will provide a durable barrier to termites.

Various embodiments of a plural layer stock material are contemplated. In one embodiment, the invention comprises, in order, protective film (preferably polyester but may be other plastics, acrylic, latex, paper, etc.), stainless steel mesh, asphalt compound, and a release liner (which is preferably polyethylene but may be other plastics, acrylic, latex, paper, etc.). This is the basic construction, and may be varied. For example, in a second embodiment, the layers are ordered as follows. In a symmetrical construction, the release liner is followed by asphalt compound, then by stainless steel mesh, then by a second layer of asphalt compound, then by a second release liner, or protective film. In still another embodiment, there is provided, in order, a release liner, asphalt compound, fiber reinforced material (preferably fiberglass), asphalt compound, stainless steel mesh, and finally protective film.

Each of these constructions is flexible, in addition to providing barriers to both water and termites. The resultant barrier is therefore quite practical to apply to building elements, since it can be folded around corners and in other situations. The material can be cut by ordinary tools, yet remains durable after installation and retains significant tensile strength.

Accordingly, it is a principal object of the invention to provide an architectural barrier for lining subterranean walls and other building surfaces that is impenetrable by both water and termites.

It is another object of the invention that the novel barrier be flexible and capable of being folded.

It is a further object of the invention that the novel barrier be installed using conventional tools and standard installation techniques.

Still another object of the invention is to provide a novel barrier that will stay attached to a vertical surface during construction.

An additional object of the invention is to enable installation by adhesion to building surfaces.

It is again an object of the invention to preserve adhesive qualities of the novel barrier prior to installation.

Still yet another object of the invention is to provide a barrier with easy to seal joints and a waterproof layer that provide durability against the corrosive properties of soil and other backfill materials.

It is yet another object of the invention to provide waterproofing and termite protection for attachment to a wide range of subterranean building surfaces, including but not limited to wood, brick, concrete, concrete block, steel, plastic, and plastic foam insulation material.

It is yet a further object of the invention to insure that the tacky material of the novel web will not adhere to itself during manufacture, packaging, storage, transportation and installation, or be exposed to the elements and construction activity after installation and during building construction.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein:

FIG. 3 is a front elevational view of one embodiment of the novel web, with the various layers broken away progressively to reveal the internal construction.

FIG. 4 is a front elevational view of a second embodiment of the novel web, with the various layers broken away progressively to reveal the internal construction.

FIG. 5 is a front elevational view of a third embodiment of the novel web, with the various layers broken away progressively to reveal the internal construction.

DETAILED DESCRIPTION OF THE PREFERRED EMBODIMENTS

Figure 1:
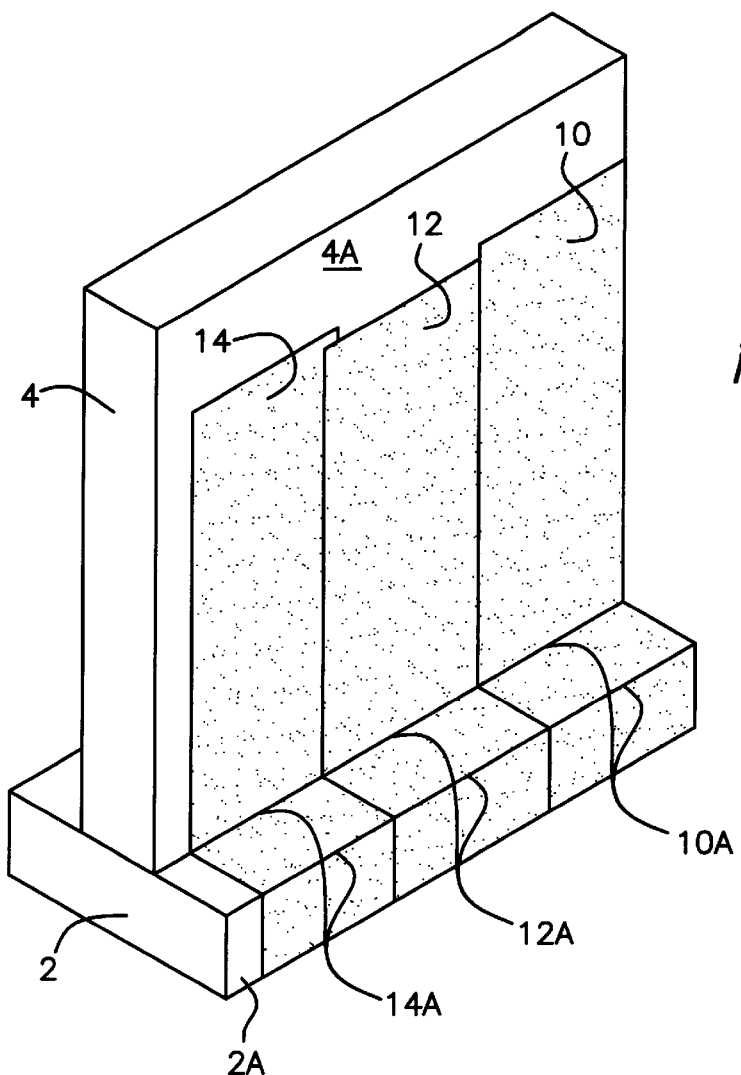
FIG. 1 is an environmental, perspective view of the invention installed on subterranean building components.

FIG. 1 of the drawings illustrates a first embodiment of the invention, as installed on a foundation footing 2 and subterranean wall 4 of a building (not shown in its entirety). The novel web is installed in individual sheets 10, 12, 14 successively adhered to external surfaces of footing 2 and wall 4. Each sheet 10, 12, or 14 overlaps its predecessor to assure continuity of the barrier of protection. Special attention should be given to all seams, edges, overlaps, corners, patches, and protrusions during installation to maintain the integrity of both the waterproofing and the termite barrier. These joints may need crimped edges, heat sealing, compression with a roller or other tool, caulking, or any combination of these and other sealing techniques, depending on the application. All stainless steel mesh joints should maintain the proper distance required to prevent the passage of a termite.

The novel web is flexible, so that sheets 10, 12, 14 may be folded, as indicated at 10A, 12A, and 14A, to conform closely to footing 2 and wall 4, as well as to fit around corners of wall 4 and intersecting walls. Surface 4A is preferably dry primed to enable adhesion by a tacky material. This construction provides a waterproof barrier that goes beyond a simple dampness or moisture barrier in protecting the building. The flexibility allows flashing to be created around corners joints, projections, and dissimilar materials and surfaces. Once installed, the present invention need not be installed again as it will not deteriorate over time.

Figure 2:
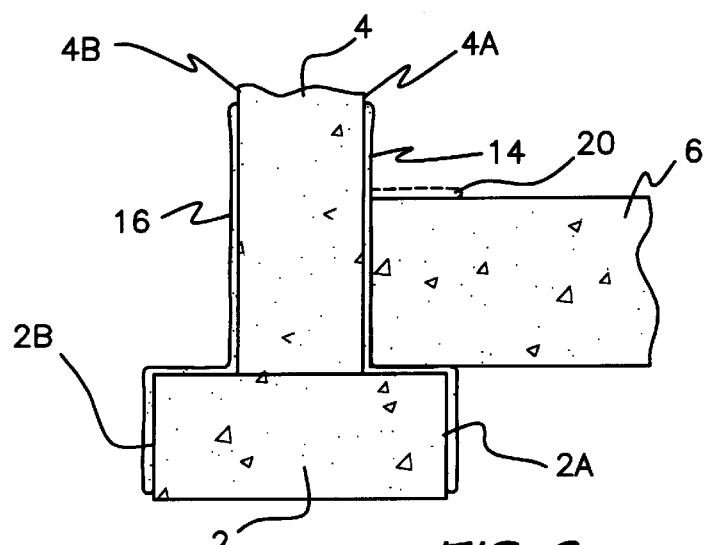
FIG. 2 is a side view illustrating the invention in a further stage of construction from that of FIG. 1.

FIG. 2 shows a further stage in construction of a building protected according to the invention. Both interior surfaces 2A, 4A and exterior surfaces 2B, 4B of footing 2 and wall 4 have been covered by a novel web 14, 16. A concrete floor 6 is poured in conventional fashion, trapping web 14 between floor 6, on one side, and footing 2 and wall 4 on the other side. Above the floor 6, the web 14 extends along wall 4 as shown by the solid line, or may extend along the floor 6 as shown by dotted line 20. The barrier thus formed in the building affords protection from both penetration of water and by termites. It will be appreciated that it is a standard building practice that a well designed drainage system (not shown as not being part of the present invention) be installed to remove excess water from the footer and wall area. It will also be appreciated that the potential of hydrostatic pressure at the exterior of the building may become so great that a drainage system will be required.

FIG. 3 illustrates construction of one embodiment of webs 10, 12, 14, and 16. The invention is preferably provided as a generally flat web 100 having nominal thickness, and comprising several strata. Web 100 is covered by protective film 102. Behind film 102 in the depiction of FIG. 3 is a mesh screen 104, fabricated from stainless steel and having mesh openings sized small enough to prevent passage of a termite. Although the actual opening size may vary according to sizes of species or variations of termites in different locales, mesh opening sizes will generally not exceed one thirty-second of an inch in any diameter.

Web 100 includes a rubberized asphalt compound (or other waterproof material) 106 behind mesh screen 104. The asphalt compound 106 is in a plastic state and fills the recesses of the mesh screen 104 to thereby embed the screen 104. A release liner 108 covers asphalt compound 106. Release liner 108 comprises any suitable material which will adhere to compound 106, but may be pulled free manually to expose compound 106. Liner 108 is removed immediately prior to installing web 100 onto a surface of an architectural member being protected.

FIG. 4 shows a web 200 having similar protection benefits as web 100, but varying in construction. Web 200 includes, in the order illustrated, a release liner 202, a first layer 204 of rubberized asphalt compound(or other waterproof material), stainless steel mesh screen 206, a second layer 208 of rubberized asphalt compound(or other waterproof material), and a final layer in the form of a second release liner 210. The asphalt compound in layers 204 and 208 are in a plastic state and fill the recesses of the mesh screen 206 to thereby thoroughly embed the screen 206 from both directions. In addition the two asphalt layers make web 200 symmetrical, and therefore the web 200 need not be oriented with respect to which side must be exposed to the architectural member in order to present a tacky surface thereto. The second release liner protects the exterior tacky surface, and once removed allows additional materials to be added and adhered to the exterior membrane surface after installation of the web. This technique is known and used with other type of protective construction webs. Should this double sided feature be unnecessary, a further embodiment of the web is provided wherein the final layer 210 is in the form of a non-removable protective film as opposed to a release liner.

FIG. 5 illustrates a third embodiment of the invention wherein web 300 has, in the order illustrated, a protective film 302, a stainless steel mesh screen 304, a first layer 306 of rubberized asphalt compound (or other waterproof material), a layer of fiber reinforced material 308, (preferably fiberglass) a second layer 310 of rubberized asphalt compound (or other waterproof material), and a release liner 312. In this embodiment, the asphalt compound in layers 306 and 310 embed the fiber reinforced material 308 from both directions, while the asphalt compound in layer 306 fills the recesses of the mesh screen 304.

Throughout the various embodiments, individual layers may be essentially similar. For example, the screen mesh 104 of FIG. 1 may be similar or identical to the screen mesh 206 of FIG. 2 and the screen mesh 304 of FIG. 3. This screen mesh is preferably stainless steel as is available from building supply and hardware stores. The asphalt compound in each embodiment acts as a water barrier, with a tacky surface for adhesion to surfaces while filling small voids in the surfaces, while also acting as a binder for the other layers. Similarly, release liners 108, 202, 210 and 312 may be fabricated from the same stock material, as are protective films 102, 210 (further embodiment) and 302. The present invention uses stock materials to form a novel web that is laminated into an integral structure using heat and mill forming.

Architectural surfaces may require that a primer or adhesive be applied prior to the installation of the novel barrier. All surfaces should be dry and clean prior to the installation of the web. It should be noted, however, that once installed, the waterproofing (as opposed to a simple barrier to moisture or dampness) ability of the asphalt compound protects the building components, even should rain fill the area about the wall prior to backfilling. It should also be noted that it is standard construction practice to install a well designed drainage system at or around building foundation footings to remove excess water and hydrostatic pressure.

It is to be understood that the present invention is not limited to the embodiments described above, but encompasses any and all embodiments within the scope of the following claims.

I claim:

1. A waterproofing membrane and termite barrier for protecting an exterior building surface, said waterproofing membrane and termite barrier comprising:

a protective film;

a metal mesh screen including recesses sized to inhibit the passage of termites therethrough, said screen being adjacent said protective film;

a tacky waterproof compound, said tacky waterproof compound filling said recesses in said screen and contacting said protective film to thereby bind the barrier together; and a release liner covering and protecting said tacky waterproof compound prior to applying said barrier to the building surface.

2. The waterproofing membrane and termite barrier according to claim 1, wherein said metal mesh screen is made of stainless steel.

3. The waterproofing membrane and termite barrier according to claim 1, wherein said protective film is made of polyester.

4. The waterproofing membrane and termite barrier according to claim 1, wherein said tacky waterproof compound is a rubberized asphaltic compound.

5. The waterproofing membrane and termite barrier according to claim 1, wherein said release liner is made of polyethylene.

* * * * *